Oct. 9, 1923.
C. STEENSTRUP
1,470,506
METHOD OF MANUFACTURING TURBINE ELEMENTS
Filed Dec. 23, 1921
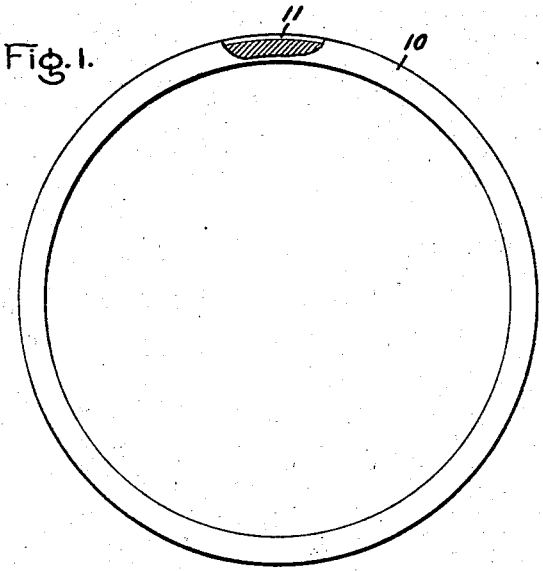
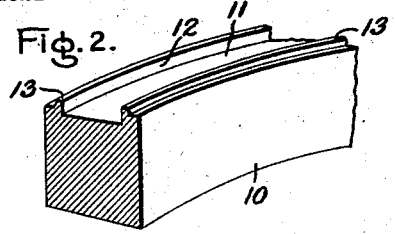
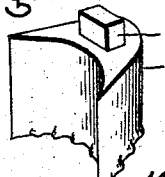
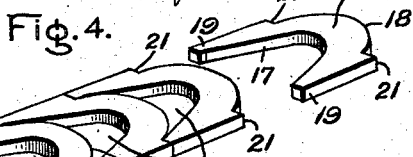
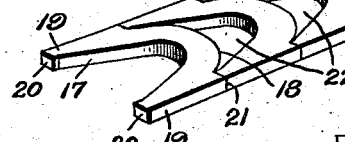
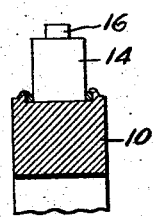
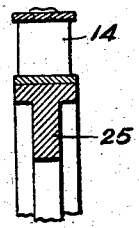
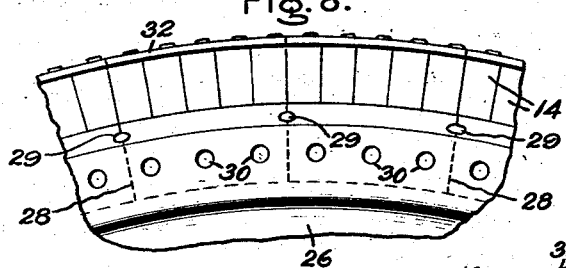
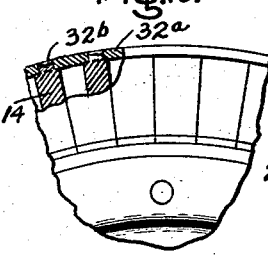
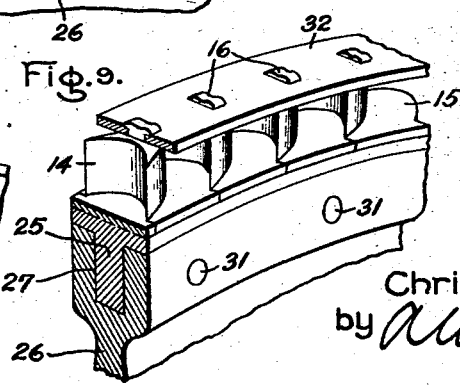
Inventor:
Christian Steenstrup
by Albert G. Davis
His Attorney.

Patented Oct. 9, 1923.

1,470,506

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING TURBINE ELEMENTS.

Application filed December 23, 1921. Serial No. 524,398.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Turbine Elements, of which the following is a specification.

The present invention relates to elastic fluid turbines and has for its object to provide an improved method of manufacturing certain parts or elements for such machines. My invention is particularly applicable to the manufacture of turbine rotors, which, as is well known, comprise a carrying member with one or more rings of buckets or blades thereon; and my invention relates particularly to an improved method of assembling the buckets or blades and attaching them to the carrying member. It will be understood, however, that the invention is not necessarily limited to this use but may be utilized to manufacture any turbine part to which it may be found applicable.

For a consideration of what I believe to be novel and my invention, attention is directed to the accompanying description and the claims appended thereto.

In the drawing, Fig. 1 is a side elevation of a supporting member or element, here shown in the form of a ring, used in carrying out my invention; Fig. 2 is a perspective view of a short section of the ring shown in Fig. 1; Fig. 3 is a perspective view of a blade or bucket; Fig. 3ª is a detail view of a fragment of a blade or bucket; Fig. 4 is a perspective view of spacing pieces, illustrating the method of their manufacture; Fig. 5 is a side elevation of a part of a ring, such as that shown in Fig. 1, illustrating the manner of mounting blades and spacing pieces thereon; Fig. 6 is a sectional view of Fig. 5; Fig. 7 is a view similar to Fig. 6 illustrating additional steps used in carrying out the invention; Fig. 8 is a side elevation of a part of a rotor partially completed; Fig. 9 is a perspective view of a part of a completed rotor, and Fig. 10 is a detail view of a modified form of bucket cover fastening means.

In carrying out my invention, I take a supporting member 10, such as that illustrated in Figs. 1 and 2, and which may comprise either a complete ring or a segment of a ring and provide in a surface of it a continuous shallow groove 11 which has preferably straight side walls as indicated at 12. At the sides of the groove are projecting portions 13 adapted to be bent or driven over, as explained hereinafter. In the case of an axial flow rotor such as is illustrated in the present instance, groove 11 will be in the outer peripheral surface of the ring or segment. I then provide buckets or blades 14, such as those shown in Fig. 3, and spacing members 15, such as those shown in Fig. 4. The blades may be of uniform section throughout their length and have or require no specially shaped bases. They may be provided with tenons 16 for fastening a bucket cover in place when intended for use with a rotor in which the bucket cover is to be fastened in place by tenons. At their inner ends the blades are preferably provided with struckout projections 14ª, which may be formed by striking the bottom edge of the blade with a suitable tool or in any other suitable manner. Spacing members 15 may be stamped from suitable material and are of a width equal to the width of groove 11 so they will make a good fit therein. They are of a thickness less than the depth of groove 11 so that when located in the groove, portions 13 at the sides of the groove may be turned over onto them. Each spacing member has a concave forward surface 17 adapted to fit around the convex or rear surface of a blade 14 and a convex rear surface 18 adapted to fit the concave or front surface of a blade 14. The spacing members are somewhat the shape of a U, the two arms 19 having flat ends 20, and the rear of each member being provided with shoulders 21 against which the ends 20 engage, as shown in Fig. 4. When assembled after the manner shown in Fig. 4, it will be seen that the spacing members provide between them openings 22 of a size and shape to receive the end of a blade 14. The spacing members may be formed from sheet material by punching them out with a suitable die, the only waste material being that which comes out of openings 22.

In building up a rotor or rotor element, I take a ring or a segment of a ring, as shown in Figs. 1 and 2, and mount first an end spacing member 15 in the groove 11, the same being fastened firmly in position. I then mount a blade 14 in the groove just behind the spacing member, the concave surface of the blade fitting around the convex surface 18 of the spacing member. (See Fig. 9.) I then place a second spacing member 15 behind the blade and by means of a suitable tool drive it forward so as to clamp the end of blade 14 tightly between the two spacing members. The spacing members are so shaped that when driven forward the arms 19 will be very tightly wedged between the outer surface of the buckets and the sides of groove 11. For example, the ends of arms 19 of the spacing members may be spaced apart a distance a little less than the outside width of the blades at their edges so that when a spacing member is driven forward around the back of a blade the arms will be spread and wedged between the outer surface of the blade end and the side walls of the groove. The projections 14$^a$ at the inner end of the blade have sloping outer surfaces and when the spacing member is driven around the back of the blade, by reason of its engagement with these surfaces, it acts to draw or force the blade tightly against the bottom of the groove. Likewise the projections at the front of the blade act in a similar manner to draw or force the blade against the bottom of the groove as they are forced into engagement with the adjacent spacing member. Furthermore, the projections 14$^a$ since they have sharp edges bite into the spacing members and become embedded therein. The projections 14$^a$ thus function to bring the blade end into engagement with the bottom of the groove and to lock the blade against coming out. They also serve to hold the blade against tilting. I then place a second bucket in position followed by another spacing member, continuing this until the segment or ring, as the case may be, is built up throughout its extent with blades, the spacing members in each instance being driven tightly around the blade ends so the parts are all in close engagement. Following this I preferably drive down on the tops of the spacing members by means of a suitable tool to seat them firmly against the bottom of groove 11 and expand or spread them somewhat to insure a tight, close fit among all the parts. I next bend over the projections 13 onto the edges of spacing members 15 after the manner shown in Fig. 6, the projections being driven down hard to tightly clamp the spacing members.

The blades and spacing members are thus firmly attached to the supporting member in what may be termed an initial or temporary manner, all adjacent surfaces being held tightly and with some pressure in close, intimate contact.

I now permanently unite the blades, spacing members and supporting member to each other by fusion of metal to form a unitary structure. Any suitable method of uniting by fusion of metal may be employed, but preferably I unite them by employing the method disclosed in my application, Serial No. 354,014, filed January 26, 1920. This method comprises placing the assembled structure in a suitable muffler containing a reducing atmosphere such as hydrogen, and heating it, an alloying metal such as copper having been previously placed adjacent to the joints between the parts to be united. When heated to a suitable temperature the copper enters the interstices between the parts and unites them to each other to form in substance an integral structure. However, my invention is not necessarily limited to this specific method of permanently uniting the parts, and it is to be understood that by the term fusion of metal I mean the particular method referred to or other suitable method.

After being permanently united by fusion of metal, the resulting unitary structure may be treated as an integral structure and finished as found desirable. Fig. 6 may represent the structure just subsequent to the same having been united by fusion of metal and it may be finished to the section shown in Fig. 7, the sides being removed and a tongue 25 formed. In case the mounting member 10 is in the form of a ring it is next cut into segments and these segments are fixed to a carrying member 26. In the present instance the carrying member is in the form of a wheel having a groove 27 in its periphery adapted to receive tongue 25, and Fig. 8 shows a portion of member 26 with a number of segments mounted thereon. The extent of the segments is indicated by the dotted lines 28. After the segments have been mounted on the carrying member they may be temporarily fastened together by spot welding as indicated at 29 in Fig. 8, after which holes 30 are bored and pins or rivets 31 put into place to fasten the segments to the carrying member. The sides of the wheel and segments may be then finally finished to exact dimensions.

At some suitable time during the manufacture of the rotor, the bucket cover sections 32 are fastened in place by tenons 16. If the bucket cover or bucket cover section is to be held in place solely by tenons 16 the same may be fixed in place at any time after the structure has been united by fusion of metal, as described above, and either prior to or subsequent to the mounting of the segments on the carrying member. However, if the bucket cover or bucket cover section is to be fastened in place on the buckets by fusion of metal, then it is put in position and fastened by tenon 16 prior to the uniting by fusion of metal operation previously described. When the bucket cover or bucket cover section is to be fastened in place by fusion of metal, instead of attaching it to the blade ends by means of tenons, as shown in Figs. 5 to 9, inclusive, I preferably fasten it in place after the manner illustrated in Fig. 10.

Referring to Fig. 10 the blades 14 are provided with smooth outer ends, i. e., the tenons 16 are omitted, and the bucket cover or bucket cover section comprises a member 32ª having spaced holes 32ᵇ through it, the holes coming in line with the blade ends. I then place the cover member 32ª in position, as shown in Fig. 10, and in each of the holes 32ᵇ I flow some molten metal by means of a suitable welding machine, thereby fastening the cover member 32ª to the blade ends in a temporary or initial manner. It will be understood that this is done just prior to the uniting by fusion of metal operation already described. The entire unitary structure including the carrying member, blades, spacing members and cover member are then permanently united to each other by fusion of metal.

While I prefer the arrangement shown for fastening the segments to the carrying member it will be understood that my invention is not necessarily limited to such arrangement but other suitable fastening means may be used. The advantage of an arrangement as shown is that the buckets are fastened to the carrying member in groups and a group may be removed and replaced without disturbing other groups. If found desirable in any particular instance, the supporting member 10 instead of being in the form of a ring which is subsequently fastened to a carrying member may be in substance the carrying member itself. In other words, the blades and spacing members may be mounted on a wheel, drum or other carrying member directly instead of through the intermediary of a supporting member such as ring 10 or ring segments.

Fig. 9 is a perpsective view of a portion of a rotor manufactured in accordance with my invention and while in the figure I have shown the outline of the spacing members and supporting member by lines, it is to be understood that after the parts are united by fusion of metal the seam or line of demarcation between the parts virtually disappears and for all practical purposes the parts are a unitary, integral structure, the strength of the joints between the materials being equal to or greater than that of the material itself. My improved method has the further advantage that no filling slots are required in the supporting member for assembling the blades and spacing members thereon, the blades and spacing members being inserted radially directly into the groove in the supporting member. This means that the assembling operation can be carried out very rapidly by relatively unskilled help. Also all the machine work is of a simple character, easily performed.

In accordance with the provisions of the patent statutes I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States, is:—

1. The method of manufacturing a turbine element which comprises taking a supporting member, blades and spacing members, said supporting member having a groove of greater width than the blades and of the same width as the spacing members, mounting the blades with their ends in said groove and with spacing members between the blade ends, said spacing members being shaped to receive blade ends between them and tightly clamp the same thereby initially fastening the blades to the supporting member, and then permanently fastening the blades, spacing members and supporting member together by fusion of metal to form a rigid, unitary structure.

2. The method of manufacturing a turbine element which comprises taking a supporting member, blades and spacing members, said supporting member having a groove of greater width than the blades and of the same widtu as the spacing members, mounting the blades with their ends in said groove and with spacing members between the blade ends, bending over the edges of the groove onto the tops of the spacing members, and then permanently uniting the parts by fusion of metal.

3. The method of manufacturing a turbine element which comprises taking a supporting member having a shallow groove therein, successively mounting blades and spacing members in said groove, the ends of the blades being held between the spacing members, turning the edges of the groove onto the tops of the spacing members to fasten them together in an initial manner, and then permanently uniting the parts by fusion of metal.

4. The method of manufacturing a turbine element which comprises taking a supporting member having a shallow groove therein, successively mounting blades and spacing members in said groove, said spacing members being shaped to surround the blade ends and having parts which are wedged between the blades and the side walls of the groove, and permanently uniting the blade ends, spacing members and supporting member by fusion of metal.

5. The method of manufacturing a turbine rotor which comprises taking a ring having a groove therein, mounting blades and spacing means in the groove and fastening them in an initial manner, permanently uniting the blades and spacing means to the ring by fusion of metal, cutting the ring into segments, and mounting the segments on a carrying member.

6. The method of manufacturing a turbine rotor which comprises taking a ring, fastening blades thereto in spaced relation to each other by fusion of metal, cutting the ring into segments, and fastening the segments to a carrying member.

7. The method of manufacturing a turbine element which comprises taking a supporting member having a groove therein, mounting blades and spacing members in said groove, the ends of the blades being held between the spacing members and being provided with projections which are embedded in the spacing members, and then permanently uniting the blade ends, spacing members and supporting member by fusion of metal to form a rigid, unitary structure.

8. The method of manufacturing a turbine element which comprises taking a supporting member having a groove therein, mounting blades and spacing members in said groove, the ends of the blades being held between the spacing members, and said blade ends and spacing members being provided one with projections embedded in the other, and then permanently uniting the blades, spacing members and supporting members by fusion of metal to form a rigid unitary structure.

9. In the manufacture of a turbine rotor, the method of fastening a bucket cover member in position which comprises taking a bucket cover member having spaced holes therein, placing it over the ends of the buckets with the holes in line therewith, flowing metal into the holes to fasten the cover to the ends in an initial manner, and then permanently uniting the cover and bucket ends by fusion of metal.

In witness whereof, I have hereunto set my hand this 21st day of December, 1921.

CHRISTIAN STEENSTRUP.